United States Patent [19]

Shook

[11] Patent Number: 4,536,635

[45] Date of Patent: Aug. 20, 1985

[54] METHOD AND APPARATUS FOR CLEANING WELDING ELECTRODE WHEELS WITH HIGH PRESSURE WATER

[75] Inventor: Forrest A. Shook, Fenton, Mich.

[73] Assignee: NLB Corp., Wixom, Mich.

[21] Appl. No.: 531,053

[22] Filed: Sep. 12, 1983

[51] Int. Cl.³ .................................... B23K 11/36
[52] U.S. Cl. ........................ 219/83; 219/81; 239/127
[58] Field of Search ............... 219/81, 83; 239/126, 239/127

[56] References Cited

U.S. PATENT DOCUMENTS 3,904,116  9/1975  Jones et al. .................... 239/127
3,958,724  5/1976  Ordway ......................... 239/127

FOREIGN PATENT DOCUMENTS 0030748  6/1981  European Pat. Off. ........... 219/81
1066625  4/1967  United Kingdom .............. 219/83

Primary Examiner—Roy N. Envall, Jr.
Assistant Examiner—Alfred S. Keve
Attorney, Agent, or Firm—Cullen, Sloman, Cantor, Grauer, Scott & Rutherford

[57] ABSTRACT

A fluid circulating apparatus for cleaning welding electrode wheels with a spray of fluid. A high pressure pump draws the fluid from a tank and distributes it to a plurality of welding stations where nozzles spray the fluid on the electrodes. Flow of water through the system is balanced by providing a dumping outlet through which fluid is released from the system when the welding machine is not performing a welding operation. A diverting valve is used to shift the fluid flow from the nozzles to the dumping outlet. An integrated fluid control system is disclosed for controlling both the welding machine and cleaning apparatus.

8 Claims, 4 Drawing Figures

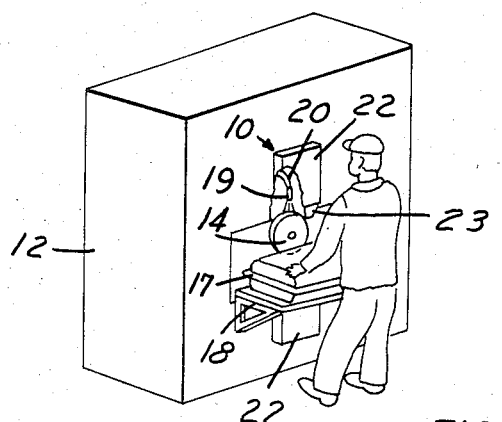
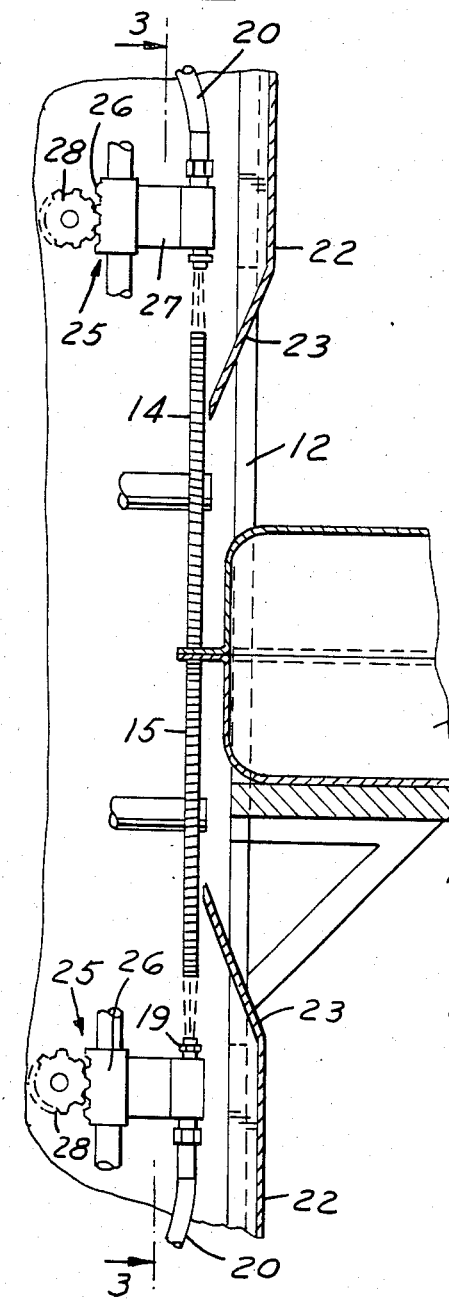
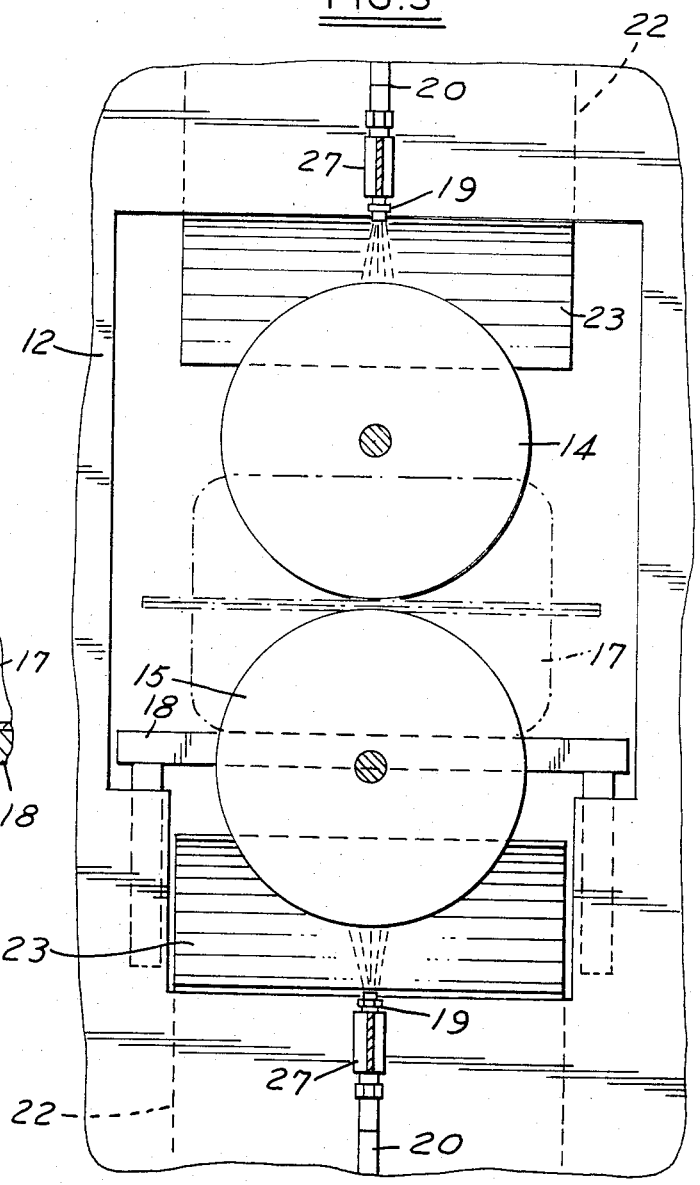
FIG.1
FIG.2
FIG.3

METHOD AND APPARATUS FOR CLEANING WELDING ELECTRODE WHEELS WITH HIGH PRESSURE WATER

BACKGROUND OF THE INVENTION

The present invention relates to a method and apparatus for cleaning the electrodes of a welder and more particularly to a method and apparatus for cleaning welding electrode wheels with a high pressure fluid spray.

In resistance welding operations, dressing tools are typically used to clean electrodes by a grinding or brushing process. If debris is permitted to build up on electrodes, weld quality is reduced. Dressing electrodes is done on a periodic basis to maintain welding quality.

Resistance welders having electrode wheels are used for welding seams by passing electrical current from one electrode wheel to another through adjacent flanges of a workpiece. Seam welding is frequently a critical operation, for instance, when forming an automotive gasoline tank it is important that the weld is continuous and strong.

Accumulation of dirt and debris on electrodes is aggravated when galvanized or other coated metal is welded. It has been found that zinc deposits in various metal coatings tend to accumulate on the surface of welding electrodes which interferes with the welding process. Therefore, the frequency of cleaning welding electrodes must be increased to maintain consistent weld quality.

Interrupting welding operations to dress electrodes by traditional methods causes excessive machine downtime, therefore, there is a need for a simple, reliable and effective method and apparatus for cleaning welding electrodes and in particular for cleaning welding electrode wheels used in critical seam weld operations.

SUMMARY OF THE INVENTION

The present invention relates to a method and apparatus for cleaning welding electrodes on a welding machine having electrode wheels with a fluid spray. Fluid is drawn from a tank by a high pressure pump which is connected by a manifold and tube distribution system to nozzles which direct a spray of fluid toward a portion of the periphery of the electrode wheels.

It is preferred that fluid is sprayed on the electrode wheels only when the welder is actually welding workpieces. When the welding operation is interrupted or stopped, the flow of fluid to the system is maintained so that the high pressure pump may operate on a continuous basis. Therefore, when the welding operation is interrupted, fluid from the system is diverted to a dumping outlet and returns fluid to the tank. A valve, controlled by the welder control, is used to shift the flow of water from the nozzles to the dumping outlet.

When a plurality of welding stations are supplied by a single pump and manifold system constant flow of fluid through the system is maintained by the valve and dumping outlet which balances the entire system.

In larger systems, it is desirable to provide a fluid channel for starting the high pressure pump that places a reduced load on the pump drive motor until the motor reaches its operating speed.

Another feature of the apparatus of the present invention is the provision of a nozzle mount which is adjustable relative to the electrode wheels to compensate for wear of the wheels. The spacing between the nozzles and the electrode wheels is important for establishing a properly directed fluid spray on the electrode wheels.

These and other features of the present invention will become more readily apparent upon studying the following detailed description in view of the drawings.

BRIEF DESCRIPTION OF THE DRAWINGS

FIG. 1 is a perspective view of a welder having welding electrode wheels and cleaning apparatus of the present invention.

FIG. 2 is a fragmentary cross-sectional view showing the nozzles used to direct a spray of fluid at the electrode wheels.

FIG. 3 is a cross-sectional view taken along the line 3—3 in FIG. 2 showing the location of the nozzles relative to the welding electrode wheels.

DETAILED DESCRIPTION

Figure 4:
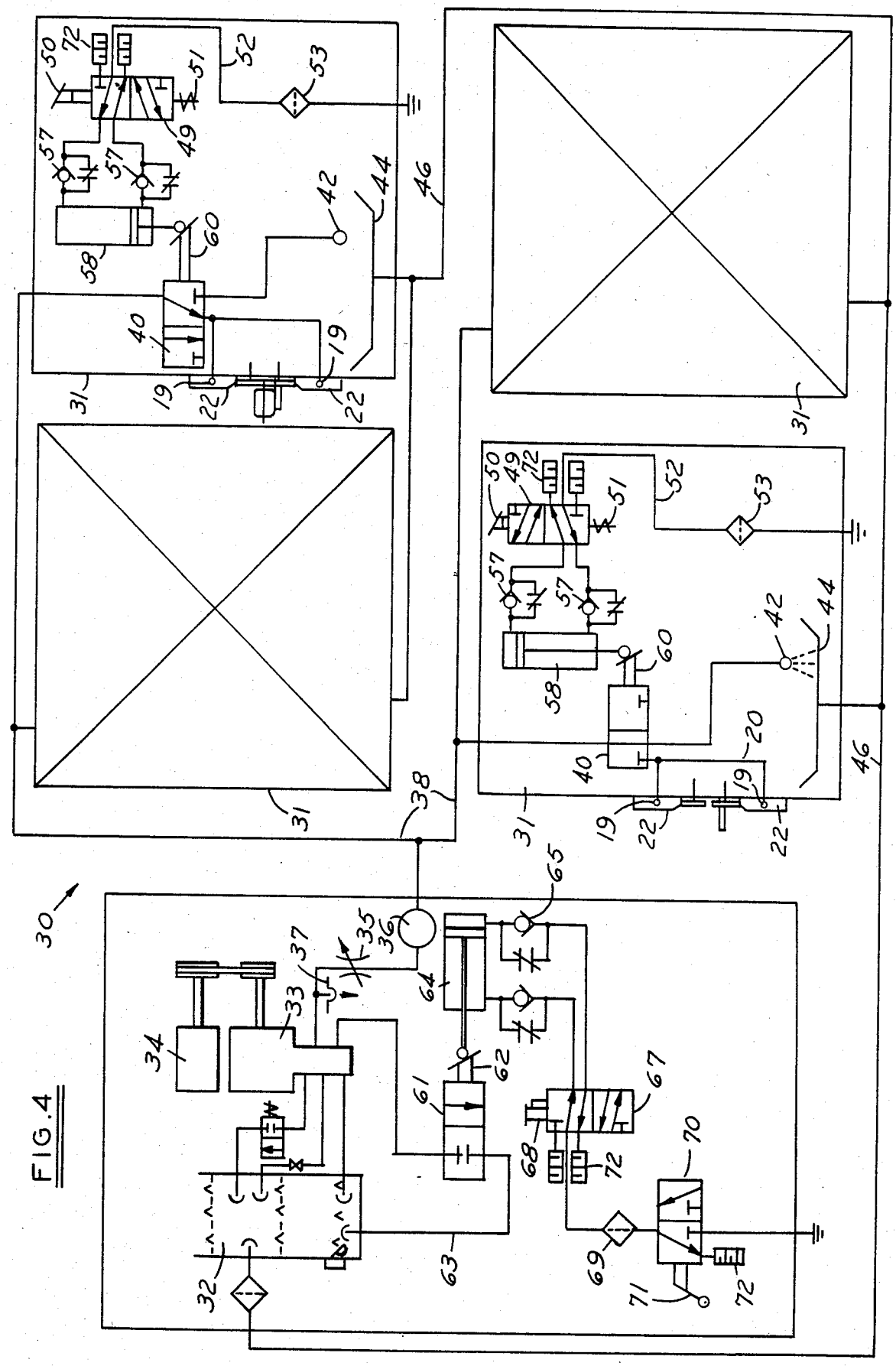
FIG. 4 is a fluid control diagram of the present invention.

The apparatus for cleaning welding electrodes, generally indicated by reference numeral 10, is shown in FIG. 1 attached to a welding machine 12. The welding machine 12 has first and second electrode wheels 14 and 15 for welding a seam on a workpiece 17. The workpiece 17 is supported on a platform 18 which is secured to the welding machine 12.

As shown in FIGS. 2 and 3, a nozzle 19 is directed toward a portion of the periphery of the each of the first and second electrode wheels 14 and 15. Tubing 20 is attached to the nozzle 19 for delivering fluid to the nozzle 19. A housing 22 encloses the nozzle 19 for shielding the operator from the fluid spray. The housing 22 includes an integrally formed deflector 23 near each of the first and second electrode wheels 14 and 15 to direct overspray back toward the inside of the welding machine 12.

The nozzle 19 directs a high pressure, low volume spray of water at the periphery of the electrode wheel. The spray of water must be adjusted to fan outwardly from the nozzle to impinge upon the entire width of the electrode wheel. Adjustment means 25 are provided to keep the nozzle 19 the proper distance from the electrode wheel. The adjustment means 25 in the disclosed embodiment includes a rack 26 which is secured to a bracket 27 that holds the nozzle 19. The rack 26 is moved toward and away from the electrode wheel by means of a pinion gear 28. As the electrode wheels 14 and 15 wear the distance between the nozzle and the periphery of the electrode wheel requires movement of the nozzle 19 with the adjustment means 25 for optimum cleaning effectiveness. It should be understood that other types of adjustment means 25 may be provided such as a screw jack or a proportional linkage to the shaft of the electrode wheel.

Referring now to FIG. 4, a system including several welding machines 12 and apparatus for cleaning electrodes 10 is shown diagrammatically. The system 30 includes a plurality of stations 31 which each include a welding machine 12 and apparatus for cleaning welding electrodes 10. The system 30 includes a tank 32 for containing the fluid to be sprayed upon the first and second electrode wheels 14 and 15. The fluid, preferably water or a water based solvent, is drawn from the tank 32 by a pump 33 which is driven by a motor 34. The pump 33 is preferably a high pressure pump capable of developing 5,000 to 10,000 psi of pressure. The pressurized fluid passes through a pulsation damper 36 which dampens pulsations in the fluid flow from the pump 33. An adjustable relief bypass valve 35 is provided in the manifold 38 for adjusting system pressure and a rupture disc 37 is provided in the manifold 38 to prevent overpressurizing the system. The manifold 38 distributes the fluid to each of the stations 31.

In the illustrated embodiment, four stations 31 are shown with the station in the upper right hand corner of FIG. 4 showing the condition of the fluid system during a welding operation. The station in the lower left hand corner illustrates the condition of the fluid circuit when welding operations are interrupted. It should be understood that any number of stations can be provided according to the teaching of the present invention.

When the welding operation is in progress fluid is received from the manifold 38 and is directed to the nozzles 19 through the diverting valve 40. When the welding operation is interrupted the diverting valve 40 directs the flow of fluid from the manifold 38 to a dumping outlet 42. The dumping outlet 42 preferably has the same cross-sectional area as both of the nozzles 19 in combination to provide substantially the same resistance to fluid flow as is provided by the two nozzles 19. This assures that a constant fluid demand is received from each of the stations 31 both during welding operations and when welding operations are interrupted. Fluid from the dumping outlet 42 is returned to the tank by means of the drain 44 which captures fluid from both the dumping outlet 42 and the nozzles 19 and returns to the tank by means of the return piping 46.

The diverting valve 40 is controlled by an air valve 49 which is in turn shifted by a foot pedal 50 for operating both the welder and the apparatus for cleaning the electrodes. The air valve 49 has two positions and is urged into its non-operating position by means of a spring return 51. The air valve 49 is supplied with air by the air line 52 which includes a filter 53 for purifying the air received from an external pressurized air source (not shown).

When the welder is in operation, as shown in the upper right hand corner of FIG. 4, air is received through the air line 52 and directed through a check valve network to an air cylinder 58 which is operatively connected to the valve operator 60 of the diverting valve 40. This causes the diverting valve 40 to shift to the position wherein the fluid from the manifold 38 is directed to the nozzles 19.

When the welding operation is stopped or otherwise interrupted, as shown in the lower left hand station, the foot pedal 50 is released and the spring return 51 forces the valve back to its original position wherein air from the air line 52 is directed to the opposite side of the cylinder 58 through the adjustable speed control/check valve network 57. Shifting the air cyclinder 58 permits the diverting valve 40 to return to the position wherein the fluid received from the manifold 38 is directed by the diverting valve 40 to the dumping outlet 42.

Due to the large volume of fluid contained in the entire system 30 a no load start-up piping circuit 63 is provided to facilitate start-up of the high pressure pump 33. When starting the pump 33, as shown in FIG. 4, a start-up valve 61 allows the fluid to be conducted through the start up piping circuit 63 back into the tank 32. After the pump 33 has been started and has run for a short period of time, the start-up valve 61 is then shifted from the position shown in FIG. 4 causing the fluid from the pump to be directed into the system manifold 38 and commencing operation of the system 30.

The valve operator 62 is shifted by means of an air cylinder 64 which is connected through an adjustable speed control/check valve network 65 to be controlled by air valve 67. Air valve 67 is shifted by means of a valve operator 68 which is in turn controlled electrically, as is well known in the art. Air is received by the air valve 67 from a pressurized air source (not shown) through a filter 69. A master disconnect valve 70 is provided to interrupt the supply of air to the entire system upon actuation of the limit switch 71.

To reduce noise from air exhausted from valves 49, 67 and 70, mufflers 72 are preferably connected to each port from which air may be exhausted.

It should be understood that the above description is provided by way of example and not by way of limitation. Many variations and changes may be made to the disclosed apparatus and method. The scope of the present invention should be interpreted with reference to the following claims.

I claim:

1. An apparatus comprising:
   a welding machine having first and second wheel electrodes which engage a workpiece at adjacent circumferential points on the wheel electrodes and weld the workpiece by passing electrical current through the workpiece;
   a tank adapted to hold a supply of fluid;
   a pump operatively connected to the tank for drawing fluid from the tank;
   first and second nozzle means for directing a spray of fluid toward a portion of the periphery of said first and second wheel electrodes respectively, said portion of the periphery of said first and second wheel electrodes being circumferentially spaced from the adjacent circumferential points on the wheel electrodes which engage the workpiece;
   piping means interconnecting first and second nozzle means with the tank for transferring the fluid from the tank to the first and second nozzle means; and
   first and second brackets attached to the first and second nozzle means respectively and having adjustment means thereto for adjusting the location of the first and second nozzle means relative to the first and second wheel electrodes to adjust the cleaning spray, said adjustment means comprising a rack and pinion gear set, or the like, having two parts with one of the parts secured to the nozzle means and the other of said parts being secured to the welding machine.

2. The apparatus of claim 1 wherein a valve means is interposed between the piping means, first and second nozzle means and a dumping outlet for shifting the flow of fluid between the nozzle means and the dumping outlet, said valve means having a first position wherein fluid is directed to the first and second nozzle means and a second position wherein fluid is directed to the dumping outlet, the flow of fluid through the valve in the first position being substantially equivalent to the flow of fluid in the second position for maintaining a substantially constant flow of fluid through the piping means.

3. The apparatus of claim 2 having drain means for returning substantially all of the fluid flowing through the piping means from the first and second nozzles and the discharge means to the tank.

4. The apparatus of claim 3 wherein a fluid circuit is provided between the tank and the pump for permitting the pump to be started with a reduced load, said fluid circuit including a valve and shunt piping loop which selectively permits fluid to flow from the tank to the pump.

5. A system for cleaning welding electrodes comprising:
- a plurality of welding machines having first and second electrode wheels for performing a welding operation by engaging opposite sides of a workpiece at adjacent points on the periphery of first and second wheel electrodes;
- a tank for holding a fluid;
- tube means interconnecting the tank with the welding machines;
- a high pressure pump connected to the tube means between the tank and the welding machines for substantially continuously displacing fluid from the tank and supplying fluid to welding machines;
- nozzle means moveably mounted relative to the first and second electrode wheels of said welding machines for directing the fluid in an adjustable spray pattern toward first and second electrode wheels;
- discharge means for releasing fluid from the tube means, said discharge means and nozzle means having substantially equal resistance to fluid flow whereby the nozzle means and the discharge means permit substantially the same quantity of fluid to flow from the tube means;
- valve means connected to the tube means between the pump and both the nozzle means and the discharge means for diverting the fluid from the nozzle means to the discharge means when the welding operation is interrupted to maintain a constant flow of fluid through the tube means; and piping for returning substantially all of the fluid flowing through the tubular means from the nozzle means and the discharge means to the tank.

6. The system of claim 5 wherein a fluid circuit is provided between the tank and the pump for permitting the pump to be started with a reduced load output, said fluid circuit including a valve and a shunt piping loop for selectively interconnecting the tank and the pump.

7. The system of claim 5 wherein the fluid directed towards the first and second electrode wheels is focused on a portion of the electrode wheel spaced from said adjacent points on the periphery of the first and second wheel electrodes to minimize the quantity of fluid required for performing a cleaning operation.

8. A method of cleaning wheel electrodes on a plurality of welding machines being connected to a tank and a pump comprising the steps of:
- welding workpieces at each welding machine;
- interrupting the welding step selectively and independently at each welding machine;
- pumping fluid continuously at high pressure from the tank into a manifold;
- spraying the fluid from the manifold through adjustably located nozzles in a controlled spray pattern upon the wheel electrodes during said welding step at each welding machine;
- diverting the fluid from the wheel electrodes to a discharge means during the interrupting step independently on each welding machine, whereby the quantity of fluid delivered by the manifold remains substantially constant regardless of the operation of the welding machines; and
- returning the fluid from the wheel electrodes and the discharge means to the tank.

* * * * *